United States Patent Office 3,376,254
Patented Apr. 2, 1968

3,376,254
STABILIZED SOLUTIONS OF COPOLYMERS FROM ACRYLONITRILE AND VINYLIDENE CHLORIDE
Heino Logemann, Leverkusen-Schlebusch, Eberhart Degener, Opladen, and Heinz Rachwalsky, Dormagen, Germany, assignors to Farbenfabriken Bayer Aktiengesellschaft, Leverkusen, Germany, a corporation of Germany
No Drawing. Filed Aug. 6, 1965, Ser. No. 477,921
Claims priority, application Germany, Aug. 25, 1964, F 43,822; Aug. 27, 1964, F 43,834, F 43,836
8 Claims. (Cl. 260—45.75)

ABSTRACT OF THE DISCLOSURE

There are disclosed novel solutions of copolymers of acrylonitrile with vinylidene chloride having a chlorine content of 20 to 60%, in organic solvents, which solutions are made stable against discoloration when subjected to increased temperature by incorporating a tin salt selected from the group consisting of stannous chloride, stannic chloride, stannous tertiary-butyl salicylate and stannous boro-fluoride. Films and fibres formed from the above stabilized solutions do not undergo any of the discoloration phenomena as previously observed.

This invention relates to solutions of copolymers of acrylonitrile and vinylidene chloride stabilized with a tin compound against action of heat.

Several different types of stabilizers have been suggested for polyacrylonitrile and copolymers of acrylonitrile containing more than 80% of acrylonitrile. Such stabilizers are intended to protect fibres and films prepared from this material against discoloration under the influence of elevated temperatures. Such discoloration can even occur during the preparation of the fibres and films, for example during the preparation of the spinning solutions, during the spinning process itself and during the subsequent fixing and crimping of the fibres. Unfortunately, the aforementioned stabilizers cannot be used to protect fibres and films prepared from copolymers of acrylonitrile with vinylidene chloride containing 20 to 60% of chlorine, against discoloration under the influence of heat.

Similarly, the numerous stabilizers and combinations thereof which have been proposed for moldings prepared from pure polyvinyl chloride and polyvinylidene chloride, or from copolymers containing a large amount of vinyl chloride or vinylidene chloride, in particular for thick-walled pressings and moldings, cannot be used for the preparation of fibres and films from copolymers of acrylonitrile with vinylidene chloride.

The difference between copolymers of acrylonitrile with vinylidene chloride containing at least 20% of chlorine, and copolymers of acrylonitrile containing at least 80% of combined acrylonitrile, is embodied in peculiarities characteristic of polymers. For example, it is not possible to obtain homogenous solutions in dimethyl formamide from a mixing consisting of an acrylonitrile-vinylidene chloride copolymer (30% chlorine) and an acrylonitrile copolymer containing at least 80% of combined acrylonitrile. Each of the two copolymers is clearly soluble in dimethyl formamide. It is not possible, however, to mix solutions of the two copolymers in dimethyl formamide together without the formation of two phases, nor can a mixture of the two polymers be dissolved without the formation of two phases.

The limit at which the polymers are compatible with one another in dimethyl formamide solution, lies at the content of about 28% of combined vinylidene chloride. Polymers of vinylidene chloride alone and also those containing a small amount of a copolymerization component, become insoluble in any type of solvent during their preparation. The different structure of the three types of copolymer, which is shown by differences in their solubility, explains why the depolymerization reactions which each of these copolymers undergoes at elevated temperature, are basically different and are inhibited by different types of stabilizers. The large number of heat stabilizers which have been proposed for copolymers of acrylonitrile containing more than 80% of acrylonitrile, cannot be used to stabilize acrylonitrile-vinylidene chloride polymers containing more than 20% of chlorine. Similarly, the conventional stabilizers for polyvinyl chloride cannot be used as stabilizers for acrylonitrile-vinylidene copolymers containing 20 to 60% of chlorine.

Organo-tin compounds, particularly dialkyl tin laurates and similar alkyl tin derivatives, have proved to be highly effective as stabilizers for polymers of vinyl chloride and its copolymers and also for a number of other chlorine-containing synthetics, so that in spite of the fairly complicated processes by which they are manufactured, tin compounds of this type have been widely used. More simple inorganic and even organic stannous salts have been proposed to protect solutions of polyacrylonitrile and its copolymers containing more than 85% of acrylonitrile, against discoloration under the influence of heat. As far as these simple stannous salts are concerned, a distinction is drawn between those which, like stannous chloride, for example, are soluble in the solvent (for example dimethyl formamide) and those which, like stannous oxalate, are insoluble therein and therefore have to be used in the form of a paste. Basically, this latter process has serious disadvantages because some of the stabilizer is dissolved during the preparation of the polymer solution at elevated temperature, and is deposited around the openings of the spinnerets, thus interfering with the progress of spinning. For this reason, only those stabilizers which are adequately soluble in the solvent, are suitable.

It has now been found that solutions in organic solvents of copolymers of acrylonitrile with vinylidene chloride containing 20 to 60% of chlorine, can very effectively be stabilized against discoloration under the influence of heat by adding stannous or stannic halides or a stannous salicylate to them in quantities of 0.001 to 5% by weight, based on polymer, preferably in quantities of 0.1 to 1.5% by weight. Stannous chloride, stannic chloride, stannous borotrifluoride or stannous tert.-butyl salicylate are used as stabilibers. The effect of stannous chloride is particularly noticeable when it is used in combination with a small quantity, for example 0.001 to 3 parts by weight, based on polymer, of a concentrated acid, such as concentrated hydrochloric acid or, for example, hydrofluoboric acid. The much more expensive alkyl tin compounds have a less intense stabilizing effect on these polymers. Stannous and stannic chloride are not at all suitable for other chlorine-containing polymers, for example, polyvinyl chloride on its own, not ony when they are used individually, but also when they are used in combination with an acid. In other words, the films or fibres prepared from polymers such as these containing the aforementioned additives, undergo very marked discoloration towards deep black when exposed to elevated temperatures. Similarly, polyacrylonitrile and its copolymers comprising more than 85% of acrylonitrile, for example with acrylic esters, are not able to withstand intensive heat treatment in the presence of stannous chloride, and definitely not in the presence of stannic chloride.

Strongly polar solvents, for example, dimethyl formamide or dimethyl acetamide, are used as solvents for the chlorine-containing acrylonitrile copolymers. The polymer content of the solution is from 5 to 55% by weight, preferably from 10 to 30% by weight. The stabilizers are added to the solvent either together with the polymer, shortly before it or, if desired, even after it. It is also possible to add them to the polymer during or, advantageously, on completion of washing. The addition of a concentrated acid, such as concentrated hydrochloric acid or hydrofluoboric acid, keeps the solutions themselves considerably lighter in color when the polymer and solvent are heated to elevated temperatures in the preparation of the solution, with the result that the filaments and films prepared from the solution are not nearly so brown in color as they would be if no acid were added. In place of hydrochloric acid, it is possible to use materials which generate this acid.

The following examples show that, unlike other polymers, an outstanding protective effect against the influence of elevated temperatures, particularly over long periods, is obtained in cases where the tin stabilizers according to the invention are used in acrylonitrile-vinylidene chloride copolymers containing 20 to 60% of chlorine, preferably in the presence of a small quantity of a concentrated acid.

Example 1

10% by weight solutions of a copolymer of 60 parts by weight of acrylonitrile and 40 parts by weight of vinylidene chloride in dimethyl formamide are prepared. Solution 1, which is used as the comparison solution, does not contain any other additives. The other solutions each contain the specified quantities of tin compounds (expressed in percentages by weight, based on polymer). The solutions are aged for 16 hours at 80° C. in thermostats. Using an extrusion coater, films of approximately equal thickness are extruded from the aged solutions on to glass plates, and are dried overnight in a drying cabinet at 50° C. The films are removed from the glass plates, clamped in glass frames, washed in water for 1 hour at 70° C. and then dried again. They are then heat-treated for 4 and 8 hours, respectively, in a through-circulation drying cabinet at 140° C. The light absorption of the more or less yellowish-brown films is measured in a General Electrical spectral photometer. Since the thickness of each film differs slightly from the desired thickness of 50μ, the measured light transmission values are corrected for these small differences with the aid of Beer's law. The light absorption of the films is not measured against a clear, standard film. As a result, the maximum light transmission which can be obtained amounts to some 92%:

LIGHT TRANSMITTANCE OF THE 50μ THICK FILMS IN PERCENT

| Solution | Stabilizer | Appearance of sol. | After 4 hours' ageing at 140° and λ in mμ | | | | | After 8 hours' ageing at 140° C. and λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 1.5 | 7.2 | 19.8 | 35.4 | 49.7 | 0.1 | 0.1 | 1.6 | 7.1 | 17.9 |
| 2 | 0.25% SnCl$_2$·2H$_2$O | do | 25.0 | 45.3 | 61.2 | 71.4 | 78.1 | 9.1 | 24.2 | 43.2 | 58.8 | 69.3 |
| 3 | 0.5% SnCl$_2$·2H$_2$O | do | 32.0 | 53.5 | 67.2 | 75.9 | 81.2 | 14.4 | 33.1 | 51.7 | 64.7 | 73.3 |
| 4 | 1% SnCl$_2$·2H$_2$O | do | 32.0 | 52.6 | 65.5 | 73.0 | 77.6 | 16.5 | 37.0 | 54.5 | 66.2 | 73.5 |
| 5 | 1.5% SnCl$_2$·2H$_2$O | do | 27.0 | 46.6 | 59.6 | 67.9 | 73.4 | 15.0 | 34.0 | 49.6 | 60.9 | 68.5 |
| 6 | 0.56% SnCl$_4$ | do | 32.1 | 54.1 | 67.4 | 75.6 | 80.0 | 21.2 | 43.0 | 60.1 | 70.9 | 77.8 |
| 7 | .112% SnCl$_4$ | do | 32.0 | 54.5 | 68.3 | 76.4 | 81.3 | 21.7 | 45.5 | 62.5 | 72.6 | 79.1 |
| 8 | 2.23% SnCl$_4$ | do | 36.6 | 58.5 | 70.5 | 77.9 | 82.3 | 18.1 | 42.0 | 59.5 | 70.5 | 77.6 |
| 9 | 3.35% SnCl$_4$ | do | 33.4 | 54.7 | 67.5 | 75.4 | 80.1 | 18.9 | 41.4 | 58.1 | 69.0 | 76.0 |
| 10 | 0.25% SnBr$_2$ | do | 21.2 | 40.9 | 57.8 | 69.2 | 76.6 | 3.0 | 11.7 | 27.4 | 45.2 | 57.8 |
| 11 | 0.5% SnBr$_2$ | do | 30.0 | 50.1 | 64.5 | 73.7 | 79.4 | 7.1 | 21.1 | 39.5 | 55.4 | 67.0 |
| 12 | 1% SnBr$_2$ | do | 35.9 | 55.1 | 67.6 | 75.5 | 80.1 | 5.0 | 17.7 | 36.8 | 53.3 | 65.7 |
| 13 | 1.5% SnBr$_2$ | do | 31.1 | 51.5 | 64.6 | 72.6 | 77.8 | 12.8 | 31.8 | 50.0 | 61.6 | 70.9 |
| 14 | 0.5% SnI$_2$ | Deposit | 9.0 | 25.2 | 54.1 | 59.3 | 70.6 | 1.0 | 3.8 | 13.0 | 28.3 | 44.5 |
| 15 | 1% SnI$_2$ | do | 16.0 | 37.6 | 54.5 | 66.2 | 73.4 | 2.0 | 7.7 | 20.5 | 37.4 | 52.5 |
| 16 | 1.5% SnI$_2$ | do | 10.0 | 34.4 | 53.6 | 65.1 | 72.7 | 4.7 | 16.6 | 32.9 | 49.6 | 62.1 |
| 17 | No additives | Clear | 2.7 | 11.4 | 26.8 | 42.3 | 56.7 | 0.1 | 0.5 | 3.5 | 12.0 | 25.6 |
| 18 | 0.5% SnCl$_2$·2H$_2$O | do | 31.1 | 52.1 | 66.0 | 74.8 | 80.5 | 21.2 | 41.4 | 57.8 | 68.9 | 76.2 |
| 19 | 1% SnCl$_2$·2H$_2$O | do | 31.1 | 51.5 | 65.1 | 73.4 | 78.4 | 19.1 | 40.4 | 58.0 | 68.8 | 75.6 |
| 20 | 1.5% SnCl$_2$·2H$_2$O | do | 27.6 | 44.5 | 56.1 | 64.1 | 69.7 | 15.7 | 32.2 | 45.6 | 55.2 | 62.1 |
| 21 | 0.5% SnF$_2$ | Deposit | 37.7 | 57.8 | 70.0 | 77.3 | 81.2 | 19.6 | 40.5 | 58.4 | 70.1 | 77.6 |
| 22 | 1% SnF$_2$ | do | 35.6 | 56.6 | 70.1 | 77.9 | 82.5 | 24.5 | 48.0 | 64.9 | 75.0 | 81.3 |
| 23 | 0.5% SnSO$_4$ | do | 13.0 | 30.6 | 49.0 | 63.0 | 72.4 | 1.3 | 6.5 | 19.1 | 35.1 | 50.1 |
| 24 | 1% SnSO$_4$ | do | 21.5 | 40.8 | 57.0 | 68.5 | 75.5 | 6.5 | 20.0 | 37.5 | 52.7 | 64.3 |
| 25 | 1% dibutyltin-dilaurate | Clear | 12.5 | 30.0 | 48.3 | 62.4 | 71.9 | 2.5 | 10.5 | 25.5 | 42.0 | 56.5 |
| 26 | 1.5% dibutyltin-dilaurate | do | 10.8 | 27.0 | 45.1 | 59.6 | 70.6 | 3.3 | 12.4 | 28.4 | 45.3 | 53.6 |
| 27 | 1% dioctyltin-dilaurate | do | 7.1 | 21.5 | 39.5 | 55.2 | 66.6 | 0.7 | 4.4 | 14.7 | 29.6 | 44.7 |
| 28 | 1% dibenzyltin-oxide | do | 17.4 | 38.3 | 55.7 | 67.3 | 74.2 | 7.9 | 23.6 | 42.7 | 57.1 | 58.4 |
| 29 | 1.5% dibenzyltin-oxide | do | 12.0 | 32.9 | 53.1 | 67.5 | 76.1 | 4.0 | 17.1 | 37.0 | 55.0 | 67.7 |
| 30 | 1% dibutyltin sulphide | do | 4.8 | 11.5 | 19.5 | 26.8 | 34.8 | 1.9 | 5.0 | 12.4 | 21.2 | 29.9 |
| 31 | 1.5% dibutyltin sulphide | do | 6.0 | 13.1 | 21.0 | 28.4 | 36.5 | 0.6 | 1.6 | 5.0 | 10.2 | 17.1 |

The tables illustrates the outstanding stabilizing effect of stannous and stannic chlorides and of stannous bromide. By contrast, stannous fluoride, stannous iodide and stannous sulphate do not produce satisfactory solutions. Alkyl tin compounds are far inferior in their effectiveness.

Example 2 (comparison example)

10% by weight solutions of a copolymer of 95 parts by weight of acrylonitrile and 5 parts by weight of methyl acrylate in dimethyl formamide, are prepared. Solution 1, which is used as the comparison solution, does not contain any further additives, whilst the other solutions each contain the specified quantities (expressed in percentages by weight, based on polymer), of the tin salts listed in the table. As in Example 1, the solutions are aged for 16 hours in thermostats at 80° C. Films are extruded from the solutions, washed in water for 1 hour at 70° C. and then heat-treated for 4 and 8 hours, respectively, at 140° C. The extent to which they are discolored is then measured:

LIGHT TRANSMITTANCE OF THE 50μ THICK FILMS IN PERCENT

| Solution | Stabilizer | After 4 hours' ageing at 140° C. λ in mμ | | | | | After 8 hours' ageing at 140° C. λ in mμ | | | | |
|---|---|---|---|---|---|---|---|---|---|---|---|
| | | 400 | 450 | 500 | 550 | 600 | 400 | 450 | 500 | 550 | 600 |
| 1 | No additives | 75.4 | 79.6 | 83.4 | 87.2 | 89.8 | 64.9 | 73.3 | 79.5 | 84.6 | 88.0 |
| 2 | 0.5% SnCl₂.2H₂O | 51.1 | 65.5 | 75.4 | 81.6 | 86.0 | 43.5 | 60.0 | 72.2 | 80.0 | 84.9 |
| 3 | 1% SnCl₂.2H₂O | 29.5 | 45.0 | 57.0 | 66.0 | 73.5 | 24.0 | 41.0 | 55.6 | 65.9 | 74.1 |
| 4 | 1.4 SnCl₂.2H₂O | 20.6 | 33.8 | 45.2 | 54.2 | 63.3 | 17.7 | 32.4 | 45.4 | 56.5 | 66.2 |
| 5 | 1% SnCl₂.2H₂O +1 vol. percent conc. HCl | 23.1 | 37.0 | 45.0 | 50.1 | 53.8 | 17.0 | 29.7 | 39.6 | 46.8 | 52.4 |
| 6 | 1% SnCl₂.2H₂O +1 vol. percent cc. HBF₄ | 26.3 | 39.1 | 46.8 | 51.0 | 53.9 | 25.5 | 41.4 | 53.7 | 62.4 | 68.7 |
| 7 | 0.56% SnCl₄ | 10.4 | 20.9 | 32.1 | 42.5 | 53.2 | 7.4 | 17.0 | 27.9 | 38.1 | 48.7 |
| 8 | 1.12% SnCl₄ | 14.4 | 26.7 | 38.3 | 58.3 | 58.1 | 16.6 | 30.6 | 40.4 | 53.8 | 62.3 |
| 9 | 1.68% SnCl₄ | 7.9 | 16.5 | 25.9 | 35.2 | 45.6 | 8.1 | 18.9 | 30.6 | 41.3 | 52.5 |
| 10 | 1.23% SnCl₄ | 13.6 | 22.2 | 29.6 | 33.1 | 36.3 | 10.3 | 20.5 | 29.6 | 36.3 | 42.6 |
| 11 | 0.5% dibutyltin dilautate | 75.3 | 78.7 | 82.2 | 85.3 | 87.4 | 68.3 | 74.5 | 79.9 | 84.3 | 87.1 |
| 12 | 1% dibutyltin dilaurate | 77.6 | 80.4 | 83.5 | 86.6 | 88.9 | 70.6 | 76.9 | 81.1 | 86.5 | 89.7 |
| 13 | 1.5% dibutyltin dilaurate | 75.9 | 79.6 | 83.0 | 86.6 | 89.0 | 72.0 | 77.7 | 82.5 | 86.8 | 89.8 |
| 14 | 0.5% dioctyltin dilaurate | 78.7 | 82.0 | 84.9 | 87.7 | 89.6 | 71.5 | 77.0 | 81.9 | 86.1 | 88.8 |
| 15 | 1% dioctyltin dilaurate | 77.4 | 80.8 | 84.0 | 86.9 | 88.5 | 68.8 | 75.2 | 80.6 | 84.6 | 87.2 |
| 16 | 1.5% dioctyltin dilaurate | 79.3 | 83.6 | 86.6 | 88.8 | 89.9 | 73.3 | 79.0 | 83.8 | 87.7 | 90.1 |

It is apparent from the measured data that, following heat treatment, the light transmission of the polyvinyl chloride films is reduced very considerably by stannous chloride and even further by stannic chloride, although it remained substantially unaffected in the blank test. By contrast, it is appreciably improved by an organo-tin compound.

Example 4

10% by weight solutions of a copolymer of 60 parts by weight of acrylonitrile and 40 parts by weight of vinylidene chloride in dimethyl formamide, are prepared. Solution 1, which is used as the comparison solution, does not contain any further additives, whilst the other solutions each contain 1% by weight, based on polymer, of stannous chloride or 2.23% by weight (i.e. 1% by volume) of stannic chloride, apart from small amounts of different concentrated acids (quantities in percentages by weight, based on polymer). As in Example 1, the solutions are aged for 16 hours at 80° C. in thermostats. Films are extruded from the solutions, washed in water for one hour at 70° C., and then heat-treated for 4 and 8 hours, respectively, at 140° C. The extent to which they are discolored is then measured.

tions, washed in water for 1 hour at 70° C. and then heat-treated for 4 and 8 hours, respectively, at 140° C. The extent to which they are discolored is then measured.

LIGHT TRANSMITTANCE OF THE 50μ THICK FILMS IN PERCENT

| Solution | Stabilizer | Appearance of solution | After 4 hours' ageing at 140° and λ in mμ | | | | | After 8 hours' ageing at 140° and λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 63.6 | 78.6 | 85.4 | 88.9 | 94.4 | 37.4 | 60.0 | 77.0 | 86.3 | 88.7 |
| 2 | 0.5% SnCl₂·2H₂O | do | 57.5 | 73.9 | 82.9 | 86.9 | 88.4 | 33.8 | 57.5 | 76.3 | 84.3 | 87.3 |
| 3 | 1% SnCl₂·2H₂O | do | 62.6 | 76.4 | 83.7 | 85.6 | 87.8 | 27.0 | 51.8 | 76.0 | 85.8 | 88.7 |
| 4 | 1.5% SnCl₂·2H₂O | do | 27.9 | 51.3 | 72.5 | 81.7 | 85.1 | 4.5 | 20.2 | 54.6 | 74.7 | 81.8 |
| 5 | 0.5% SnF₂ | Deposit | 55.7 | 73.2 | 83.0 | 86.6 | 87.9 | 16.1 | 42.7 | 72.5 | 84.6 | 88.1 |
| 6 | 1% SnF₂ | do | 30.3 | 55.4 | 75.7 | 83.7 | 86.2 | 1.0 | 27.7 | 61.2 | 78.5 | 84.4 |
| 7 | 1.5% SnF₂ | do | 41.1 | 64.1 | 79.2 | 84.5 | 86.3 | 13.7 | 40.3 | 70.6 | 82.6 | 86.3 |
| 8 | 0.5% SnSO₄ | do | 53.7 | 71.5 | 82.5 | 86.5 | 87.9 | 28.7 | 53.7 | 76.4 | 84.8 | 87.7 |
| 9 | 1% SnSO₄ | do | 26.7 | 53.0 | 77.0 | 85.9 | 88.5 | 3.6 | 19.7 | 60.0 | 81.3 | 87.4 |
| 10 | 1.5% SnSO₄ | do | 66.2 | 79.7 | 86.4 | 88.4 | 90.3 | 42.6 | 65.3 | 80.7 | 86.3 | 88.6 |
| 11 | 1% dibutyltindilaurate | Clear | 56.2 | 72.8 | 82.6 | 87.1 | 89.3 | 31.3 | 54.4 | 73.6 | 82.9 | 86.7 |
| 12 | 1.5% dibutyltindilaurate¹ | do | 36.5 | 59.1 | 78.5 | 86.9 | 90.4 | 17.9 | 39.5 | 66.3 | 80.0 | 80.7 |
| 13 | 1% dioctyltindilaurate | do | 52.5 | 72.0 | 85.6 | 91.1 | 93.7 | 29.5 | 49.6 | 75.9 | 87.3 | 91.3 |
| 14 | 1% dibenzyltinoxide | do | 31.9 | 56.6 | 76.9 | 85.6 | 88.8 | 14.7 | 36.7 | 65.9 | 81.3 | 86.8 |
| 15 | 1.5% dibenzyltinoxide | do | 15.5 | 36.7 | 65.8 | 82.0 | 88.1 | 9.6 | 26.6 | 56.9 | 76.8 | 84.4 |
| 16 | 1% dibutyltin sulphide | do | 17.7 | 39.3 | 61.3 | 71.7 | 77.2 | 7.0 | 24.0 | 52.6 | 67.0 | 75.0 |
| 17 | 1.5% dibutyltin sulphide | do | 8.2 | 26.8 | 57.8 | 73.5 | 79.6 | 7.8 | 19.0 | 50.1 | 70.6 | 78.6 |

¹ Film coagulates; too thick.

The table shows that a chlorine-free acrylonitrile copolymer can only be stabilized to a certain extent with stannous sulphate used in very large quantities, during heat treatment for 4 and 8 hours, respectively, at 140° C. In every other case, the stabilizers listed in the table have no effect whatever and, in some instances, have an extremely damaging effect. Stannous sulphate cannot be used, however, on account of its poor solubility in dimethyl formamide.

Example 3 (comparison example)

10% by weight solutions of a vinyl chloride suspension polymer (Vestolit S 70) in tetrahydrofuran are prepared. Solution 1, which is used as the comparison solution, does not contain any other additives. The other solutions contain the specified quantities (expressed in percentages by weight, based on polymer), of the tin compounds listed in the following table. Films are extruded from the solu-

LIGHT TRANSMITTANCE OF THE 50μ THICK FILMS IN PERCENT

| Solution | Stabilizer | Appearance of solution | After 4 hours' ageing at 140° C. and λ in mμ | | | | | After 8 hours' ageing at 140° C. and λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 1.7 | 8.5 | 22.5 | 38.5 | 52.8 | 0.2 | 0.5 | 3.0 | 10.6 | 22.7 |
| 2 | 1% SnCl₂·2H₂O | do | 32.7 | 52.9 | 65.7 | 73.3 | 78.0 | 13.3 | 31.5 | 51.2 | 63.5 | 72.5 |
| 3 | 1% SnCl₂·2H₂O +0.075% vol. conc. HCl | do | 41.7 | 58.7 | 68.8 | 74.7 | 78.5 | 22.8 | 43.5 | 59.7 | 69.5 | 75.7 |
| 4 | 1% SnCl₂·2H₂O +0.25% vol. conc. HCl | do | 32.6 | 52.9 | 66.2 | 74.3 | 79.4 | 22.2 | 44.0 | 61.0 | 71.2 | 77.6 |
| 5 | 1% SnCl₂·2H₂O +1% vol. conc. HCl | do | 43.6 | 62.4 | 73.1 | 79.3 | 82.9 | 26.0 | 47.8 | 64.1 | 73.5 | 79.2 |
| 6 | 1% SnCl₂·2H₂O +3% vol. conc. HCl | do | 36.9 | 55.4 | 67.9 | 74.7 | 79.0 | 18.9 | 37.4 | 53.6 | 64.9 | 72.3 |
| 7 | 1% SnCl₂·2H₂O +0.0045% wt. H₂SO₄ | do | 31.9 | 52.7 | 67.5 | 75.9 | 81.1 | 16.4 | 36.5 | 54.8 | 67.4 | 75.4 |
| 8 | 1% SnCl₂·2H₂O +0.0075% wt. H₂SO₄ | do | 38.0 | 56.5 | 67.4 | 73.8 | 77.8 | 21.5 | 42.6 | 59.2 | 69.3 | 75.7 |
| 9 | 1% SnCl₂·2H₂O +0.0225% wt. H₂SO₄ | do | 30.1 | 50.8 | 65.0 | 73.6 | 78.9 | 12.8 | 32.1 | 50.7 | 63.5 | 71.9 |
| 10 | 1% SnCl₂·2H₂O +0.09% wt. H₂SO₄ | do | 42.5 | 59.5 | 69.5 | 75.5 | 79.2 | 22.1 | 43.5 | 59.8 | 70.0 | 76.3 |
| 11 | 1% SnCl₂·2H₂O +0.025% p-toluene sulphonic acid | do | 36.2 | 58.3 | 68.7 | 76.1 | 80.6 | 19.1 | 40.6 | 58.1 | 69.1 | 76.0 |
| 12 | 1% SnCl₂·2H₂O +0.125% p-toluene sulphonic acid | do | 36.6 | 56.0 | 68.2 | 75.4 | 79.8 | 7.3 | 22.3 | 41.8 | 57.5 | 68.5 |
| 13 | 1% SnCl₂·2H₂O +1% p-toluene sulphonic acid | do | 38.2 | 55.1 | 65.7 | 71.9 | 76.0 | 20.6 | 40.9 | 56.9 | 67.2 | 73.8 |
| 14 | 1% SnCl₂·2H₂O +0.0075% HBF₄ | do | 42.2 | 59.2 | 69.3 | 75.4 | 79.2 | 19.1 | 39.3 | 56.3 | 67.3 | 74.2 |
| 15 | 1% SnCl₂·2H₂O +0.125% HBF₄ | do | 40.3 | 58.9 | 70.1 | 76.2 | 79.9 | 24.4 | 46.0 | 62.6 | 72.0 | 77.7 |
| 16 | 1% SnCl₂·2H₂O +1% HBF₄ | do | 26.8 | 47.1 | 61.6 | 70.4 | 76.2 | 18.3 | 38.2 | 55.7 | 67.3 | 74.8 |
| 17 | 1% SnCl₂·2H₂O +1% (CH₃CO)₂O | do | 44.2 | 61.7 | 71.3 | 77.0 | 80.4 | 28.2 | 50.3 | 64.8 | 73.2 | 78.4 |
| 18 | 2.23% SnCl₄ | do | 29.8 | 49.3 | 62.5 | 70.4 | 75.6 | 13.5 | 31.5 | 48.7 | 60.7 | 69.3 |
| 19 | 2.23% SnCl₄ +0.25% vol. conc. HCl | do | 35.3 | 54.9 | 67.0 | 74.0 | 78.1 | 20.3 | 42.0 | 58.3 | 68.6 | 75.2 |
| 20 | 2.23% SnCl₄ +3% vol. conc. HCl | do | 37.1 | 56.9 | 69.4 | 76.5 | 80.7 | 19.2 | 39.3 | 56.3 | 67.7 | 75.2 |
| 21 | 2.23% SnCl₄ +0.0045% wt. H₂SO₄ | do | 34.1 | 54.1 | 65.5 | 72.4 | 76.6 | 22.4 | 44.9 | 60.5 | 70.4 | 6.4 |
| 22 | 2.23% SnCl₄ +0.125% wt. HBF₄ | do | 42.8 | 60.4 | 70.3 | 75.9 | 79.2 | 28.3 | 50.0 | 64.2 | 72.6 | 77.8 |
| | 2.23% SnCl₄ +1% wt. HBF₄ | | | | | | | | | | | |

It is apparent from the measured data that the stabilizing effect of stannous chloride is very considerably improved by the addition of a small amount of a concentrated acid, although this is not the case with stannic chloride. It is also remarkable that, in cases where stannous chloride is added in combination with an acid, particularly hydrochloric acid or hydrofluoboric acid, the solutions heated for 16 hours at 80° C. are not discolored nearly as much as with stannous chloride on its own, and remain comparatively very light in color.

Example 5

10% by weight solutions of a copolymer of 60 parts by weight of acrylonitrile and 40 parts by weight of vinylidene chloride in dimethyl formamide, are prepared. Solution 1, which is used as the comparison solution, does not contain any other additives, whilst the following solutions each contain the specified amounts of tin compounds (expressed in percentages by weight, based on polymer). As in Example 1, the solutions are aged for 16 hours at 80° C. in thermostats. Films are extruded from the solutions, washed in water for 1 hour at 70° C., and heat-treated for 4 and 8 hours, respectively, at 140° C. The extent to which they are discolored is then measured.

The outstanding stabilizing effect of stannous borofluoride is apparent from the table.

Example 6 (comparison example)

10% by weight solutions of a copolymer of 95 parts by weight of acrylonitrile and 5 parts by weight of methyl acrylate in dimethyl formamide are prepared. Solution 1, which is used as the comparison solution, does not contain any other additives, whilst the other solutions each contain the specified quantities (in percent by weight, based on polymer), of stannous borofluoride. As in Example 1, the solutions are aged for 16 hours at 80° C. in thermostats. Films are extruded from the solutions, washed in water for 1 hour at 70° C., and heat-treated for 4 and 8 hours, respectively, at 140° C. The extent to which they are discolored is then measured.

LIGHT TRANSMISSION OF THE 50μ THICK FILMS IN PERCENT

| Solution | Stabilizer | Appearance of solution | After 4 hours' ageing at 140° and λ in mμ | | | | | After 8 hours' ageing at 140° C. and λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 63.6 | 78.6 | 85.4 | 88.9 | 90.4 | 37.4 | 60.0 | 77.0 | 86.3 | 88.7 |
| 2 | 0.47% Sn(BF₄)₂ | Slightly opaque | 53.7 | 71.5 | 82.5 | 86.5 | 87.9 | 28.7 | 53.7 | 76.4 | 84.8 | 87.7 |
| 3 | 0.94% Sn(BF₄)₂ | Highly opaque | 26.7 | 53.0 | 77.0 | 85.9 | 88.5 | 3.6 | 19.7 | 60.0 | 81.3 | 87.4 |

It is apparent from the measured data that stannous borofluoride does not represent a stabilizer for chlorine-free acrylonitrile polymers, but in fact lowers the resistance of the polymer to high temperatures.

Example 7 (comparison example)

10% by weight solutions of a vinyl chloride suspension polymer (Vestolit S 70) in tetrahydrofuran, are prepared. Solution 1 which is used as the comparison solution does

LIGHT TRANSMITTANCE OF THE 50μ THICK FILM IN PERCENT

| Solution | Stabilizer | Appearance of solution | After 4 hours' ageing at 140° and λ in mμ | | | | | After 8 hours' ageing at 140° C. and λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 1.5 | 7.2 | 19.8 | 25.4 | 49.7 | 0.1 | 0.1 | 1.6 | 7.1 | 17.9 |
| 2 | 0.06% Sn(BF₄)₂ | do | 14.0 | 32.2 | 49.4 | 63.1 | 72.2 | 0.6 | 3.7 | 11.4 | 28.3 | 43.8 |
| 3 | 0.12% Sn(BF₄)₂ | do | 14.0 | 32.2 | 49.1 | 62.0 | 71.1 | 3.0 | 10.8 | 25.4 | 41.9 | 55.5 |
| 4 | 0.24% Sn(BF₄)₂ | do | 20.6 | 39.6 | 56.1 | 67.7 | 75.4 | 0.9 | 4.5 | 14.9 | 31.1 | 47.4 |
| 5 | 0.47% Sn(BF₄)₂ | do | 30.0 | 50.0 | 64.5 | 73.5 | 79.0 | 6.8 | 19.3 | 37.8 | 54.0 | 66.3 |
| 6 | 0.80% Sn(BF₄)₂ | do | 34.5 | 53.0 | 65.5 | 73.5 | 78.5 | 17.0 | 36.4 | 53.5 | 65.4 | 73.0 | not contain any other additives, whilst the other solutions each contain the specified quantities, (expressed in percentages by weight, based on polymer), of the tin compounds listed in the following table. Films are extruded from the solutions thus prepared, washed in water for 1 hour at 70° C. and heat-treated for 4 and 8 hours, respectively, at 140° C. The extent to which they discolor is then measured.

an increase in the extent to which the solutions solidify.

Example 9 (comparison example)

10% by weight solutions of a copolymer of 95 parts by weight of acrylonitrile and 5 parts by weight of methyl acrylate in dimethyl formamide, are prepared. Solution 1, which is used as the comparison solution, does not contain any other additives, whilst the following solu-

LIGHT TRANSMITTANCE OF THE 50μ THICK FILMS IN PERCENT

| Solution | Stabilizer | After 4 hours' ageing at 140° C. λ in mμ | | | | | After 8 hours' ageing at 140° C. λ in mμ | | | | |
|---|---|---|---|---|---|---|---|---|---|---|---|
| | | 400 | 450 | 500 | 550 | 600 | 400 | 450 | 500 | 550 | 600 |
| 1 | No additives | 75.4 | 79.6 | 83.4 | 87.2 | 89.8 | 64.9 | 73.3 | 79.5 | 84.6 | 88.0 |
| 2 | 0.24% Sn(BF₄)₂ | 5.8 | 15.9 | 27.3 | 36.6 | 42.9 | 1.5 | 6.0 | 15.9 | 27.6 | 37.8 |
| 3 | 0.47% Sn(BF₄)₂ | 2.2 | 6.9 | 12.1 | 15.6 | 18.3 | 0.8 | 1.4 | 4.9 | 9.5 | 14.3 |
| 4 | 0.80% Sn(BF₄)₂ | 1.4 | 3.4 | 4.8 | 5.1 | 5.6 | 0.3 | 0.3 | 1.2 | 2.5 | 4.2 |

It is apparent from the measured data that, following heat treatment, the light transmission of the polyvinyl chloride films is very considerably reduced by stannous borofluoride, although it remained substantially unaffected in the blank test. In other words, stannous borofluoride is not suitable for use as a stabilizer for polyvinyl chloride films.

tions each contain the specified quantities (in percent by weight based on polymer), of tin compounds. As in Example 1, the solutions are aged for 16 hours at 80° C. in thermostats. Films are extruded from the solutions, washed in water for 1 hour at 70° C. and heat-treated for 4 and 8 hours, respectively, at 140° C. The extent to which they are discolored is then measured.

LIGHT TRANSMITTANCE OF THE 50μ THICK FILMS IN PERCENT

| Solution | Stabilizer | Appearance of solution | After 4 hours' ageing at 140° and λ in mμ | | | | | After 8 hours' ageing at 140° and λ in mμ | | | | |
|---|---|---|---|---|---|---|---|---|---|---|---|---|
| | | | 400 | 450 | 500 | 550 | 600 | 400 | 450 | 500 | 550 | 600 |
| 1 | No additives | Clear | 63.6 | 78.6 | 85.4 | 88.9 | 90.4 | 37.4 | 60.0 | 77.0 | 86.3 | 88.7 |
| 2 | 0.5% stannous-tert.-butylsalicylate | do | 54.0 | 73.5 | 84.5 | 88.5 | 90.0 | 27.7 | 54.0 | 77.5 | 86.2 | 88.9 |
| 3 | 1% stannous-tert.-butylsalicylate | do | 56.2 | 74.9 | 84.5 | 87.7 | 88.6 | 30.5 | 56.5 | 78.5 | 86.2 | 88.5 |
| 4 | 1.5% stannous.tert.-butylsalicylate | do | 54.4 | 74.3 | 84.9 | 88.3 | 89.5 | 30.2 | 57.6 | 80.2 | 88.0 | 90.0 |
| 5 | 0.5% stannous benzoate | do | 59.3 | 75.3 | 84.0 | 87.2 | 88.5 | 30.7 | 55.9 | 78.0 | 85.8 | 88.2 |
| 6 | 1% stannous benzoate | do | 47.5 | 68.3 | 82.1 | 86.7 | 88.5 | 15.4 | 39.5 | 69.5 | 82.3 | 86.2 |
| 7 | 1.5% stannous benzoate | Slightly clouded | 61.3 | 76.5 | 84.4 | 87.1 | 88.1 | 28.7 | 55.1 | 77.9 | 85.9 | 88.2 |

Example 8

10% by weight solutions of a copolymer of 60 parts by weight of acrylonitrile and 40 parts by weight of vinylidene chloride in dimethyl formamide are prepared. Solution 1, which is used as the comparison solution, does not contain any other additives. The following solutions each contain the specified amounts (in percentages by weight, based on polymer), of tin compounds. As in Example 1, the solutions are aged for 16 hours at 80° C. in thermostats. Films are extruded from the solutions, washed in water for 1 hour at 70° C., and heat-treated for 4 and 8 hours, respectively, at 140° C. The extent to which they are discolored is then measured.

It is apparent from the measured data that both stannous tert-butyl salicylate and stannous benzoate, are not effective as stabilizers for chlorine-free acrylonitrile copolymers, but in fact lower the resistance of the polymers to high temperatures.

Example 10 (comparison example)

10% by weight solutions of a vinyl chloride suspension polymer (Vestolit S 70) in tetrahydrofuran, are prepared. Solution 1, which is used as the comparison solution, does not contain any other additives, whilst the other solutions each contain the specified quantities (in percent by weight,

LIGHT TRANSMITTANCE OF THE 50μ THICK FILMS IN PERCENT

| Solution | Stabilizer | Appearance of solution | After 4 hours' ageing at 140° and λ in mμ | | | | | After 8 hours' ageing at 40° and λ in mμ | | | | |
|---|---|---|---|---|---|---|---|---|---|---|---|---|
| | | | 400 | 450 | 500 | 550 | 600 | 400 | 450 | 400 | 550 | 600 |
| 1 | No additives | Clear | 2.7 | 11.4 | 26.8 | 43.2 | 56.7 | 0.1 | 0.5 | 3.5 | 12.0 | 25.6 |
| 2 | 0.5% stannous-tert.-butylsalicylate | do | 39.0 | 59.5 | 70.6 | 77.9 | 82.2 | 10.6 | 31.9 | 51.0 | 64.9 | 74.3 |
| 3 | 1% stannous-tert.-butylsalicylate | do | 36.2 | 56.2 | 68.3 | 75.6 | 80.1 | 20.0 | 41.0 | 58.0 | 68.8 | 75.7 |
| 4 | 1.5% stannous-tert.-butylsalicylate | do | 38.1 | 58.6 | 71.1 | 78.5 | 82.7 | 15.6 | 36.8 | 55.1 | 67.7 | 76.0 |
| 5 | 0.5% Sn₂O(CH₃CO)₂ | Almost clear | 16.4 | 35.6 | 53.1 | 65.9 | 74.2 | 3.5 | 13.0 | 29.9 | 46.9 | 60.5 |
| 6 | 1% Sn₂O(CH₃CO)₂ | Partly gel | 19.0 | 37.7 | 54.7 | 66.0 | 73.9 | 7.4 | 21.5 | 39.5 | 54.8 | 65.9 |
| 7 | 1.5% Sn₂O(CH₃CO)₂ | Gelatinous | | | | | | | | | | |
| 8 | 0.5% stannous benzoate | Almost clear | 28.5 | 48.3 | 62.2 | 71.2 | 77.2 | 5.6 | 18.1 | 35.6 | 51.6 | 63.7 |
| 9 | 1% stannous benzoate | Partly gel | 22.3 | 52.2 | 66.5 | 74.6 | 79.7 | 16.9 | 36.1 | 53.8 | 66.1 | 74.2 |
| 10 | 1.5% stannous benzoate | do | 22.7 | 43.2 | 58.9 | 69.3 | 67.3 | 10.5 | 27.6 | 46.0 | 60.2 | 70.1 |

The outstanding stabilizing effect of stannous tert.-butyl salicylate is apparent from the table. When stannous acetate and benzoate are used, the solutions solidify under the test conditions. Any increase in the amount of stannous acetate or benzoate added is accompanied by based on polymer), of the tin compounds listed in the following table. Films are extruded from the solutions thus prepared, washed in water for 1 hour at 70° C. and then tempered for 4 and 8 hours, respectively, at 140° C. The extent to which they are discolored is then measured.

LIGHT TRANSMITTANCE OF THE 50μ THICK FILMS IN PERCENT

| Solution | Stabilizer | After 4 hours' ageing at 140° C. λ in mμ | | | | | After 8 hours' ageing at 140° C. λ in mμ | | | | |
|---|---|---|---|---|---|---|---|---|---|---|---|
| | | 400 | 450 | 500 | 550 | 600 | 400 | 450 | 500 | 550 | 600 |
| 1 | No additives | 73.5 | 79.1 | 83.8 | 87.6 | 89.8 | 68.3 | 75.8 | 81.6 | 86.0 | 89.0 |
| 2 | 0.5% stannous-tert.-butylsalicylate | 75.3 | 81.2 | 85.6 | 88.5 | 89.8 | 71.0 | 78.7 | 84.2 | 87.7 | 89.6 |
| 3 | 1% stannous-tert.-butylsalicylate | 25.0 | 36.8 | 42.0 | 42.6 | 41.1 | 14.0 | 25.8 | 34.7 | 39.7 | 42.8 |
| 4 | 1.5% stannous-tert.-butylsalicylate | 6.5 | 12.3 | 14.9 | 14.0 | 13.1 | 3.6 | 8.9 | 14.0 | 16.3 | 17.6 |
| 5 | 0.5% $Sn_2O(CH_3CO_2)_2$ | 72.5 | 78.1 | 83.3 | 87.2 | 89.8 | 67.1 | 75.1 | 81.0 | 85.8 | 88.8 |
| 6 | 1% $Sn_2O(CH_3CO_2)_2$ | 70.0 | 76.4 | 81.8 | 85.9 | 88.1 | 67.9 | 76.8 | 82.9 | 86.9 | 89.1 |
| 7 | 1.5% $Sn_2O(CH_3CO_2)_2$ | 67.5 | 76.2 | 82.0 | 86.3 | 88.7 | 67.0 | 76.5 | 82.8 | 86.3 | 88.1 |
| 8 | 0.5% stannous benzoate | 73.7 | 79.7 | 83.8 | 87.2 | 89.4 | 68.9 | 76.6 | 82.6 | 86.8 | 89.6 |
| 9 | 1% stannous benzoate | 76.6 | 81.9 | 86.2 | 88.8 | 90.0 | 71.0 | 79.3 | 84.4 | 87.3 | 88.9 |
| 10 | 1.5% stannous benzoate | 68.3 | 76.1 | 81.8 | 85.8 | 88.1 | 63.9 | 73.9 | 80.9 | 85.2 | 87.8 |

It is apparent from the measured data that, following heat treatment, the light transmission of the polyvinyl chloride films, which remained substantially unaffected in the blank test, is impaired by stannous tert.-butyl salicylate whilst, in cases where stannous acetate or benzoate is used, it corresponds more or less to the blank test. Consequently, stannous tert.-butyl salicylate is not suitable for use as a stabilizer for polyvinyl chloride films.

What we claim is:

1. A composition comprising a copolymer of acrylonitrile and vinylidene chloride having a chlorine content of 20 to 60% having therein 0.001 to 5% by weight referred to the copolymer of a tin salt selected from the group consisting of stannous chloride, stannic chloride, stannous bromide, stannic fluoride, stannous borofluoride and stannous tert.-butyl salicylate and 0.001 to 3 parts by weight referred to the copolymer of a strong mineral acid selected from the group consisting of concentrated hydrochloric acid, sulfuric acid and hydrofluoboric acid.

2. A composition comprising a solution of a copolymer of acrylonitrile and vinylidene chloride having a chlorine content of 20 to 60% in a polar organic solvent selected from the group consisting of dimethylformamide and dimethylacetamide; containing 0.001 to 5% by weight referred to the copolymer of a tin salt selected from the group consisting of stannous chloride, stannic chloride, stannous bromide, stannic fluoride, stannous borofluoride and stannous tert.-butyl salicylate and 0.001 to 3 parts by weight referred to the copolymer of a strong mineral acid selected from the group consisting of concentrated hydrochloric acid, sulfuric acid and hydrofluoboric acid, said copolymer being present in said solution in an amount of from 5 to 55%.

3. A composition according to claim 2, wherein said composition contains 0.1 to 1.5% by weight referred to said copolymer of said tin salt.

4. A composition according to claim 2, wherein said mineral acid is hydrochloric acid.

5. A composition according to claim 2, wherein said tin salt is stannous chloride.

6. A composition according to claim 2, wherein said tin salt is stannic chloride.

7. A composition according to claim 2, wherein said tin salt is stannous borofluoride.

8. A composition according to claim 2, wherein said tin salt is stannous tert-butyl salicylate.

References Cited

UNITED STATES PATENTS

| 2,827,443 | 3/1958 | Rector et al. | 260—55.5 |
| 2,846,423 | 8/1958 | Hartmann | 260—85.5 |
| 2,854,436 | 9/1958 | Corbiere et al. | 260—45.75 |

DONALD E. CZAJA, Primary Examiner.

V. P. HOKE, Assistant Examiner.

UNITED STATES PATENT OFFICE
CERTIFICATE OF CORRECTION

Patent No. 3,376,254                                              April 2, 1968

Heino Logemann et·al.

It is hereby certified that error appears in the above numbered patent requiring correction and that the said Letters Patent should read as corrected below.

Column 1, line 59, "homogenous" should read -- homogeneous -- line 60, "mixing" should read -- mixture --. Columns 3 and 4, in the table, second column, line 4 thereof, "1% $ScCl_2 \cdot 2H_2O$" should read -- 1% $SnCl_2 \cdot 2H_2O$ --; same table, same column, line 7 thereof, ".112%" should read -- 1.12% --. Columns 5 and 6, the first table, second column, line 4 thereof "1.4" should read -- 1.5 --; same table, same column, line 6 thereof, "percent cc." should read -- percent --; same table, same column, line 11 thereof, "dilautate" should read -- dilaurate --; same table, same second column, line 13 thereof, "dikutyltin" should read -- dibutyltin --; same columns 5 and 6, second table, eighth column, line 1 thereof "94.4" should read -- 90.4 --; same table, nineth column, line 6 thereof, "1.0" should read -- 7.0 --. Columns 7 and 8, second table, under the heading "After 8 hours' etc." "609" should read -- 600 --. Columns 9 and 10, last table, in the heading "After 8 hours' etc." "40°" should read -- 140° --; same table, seventh column, line 1 thereof, "43.2" should read -- 42.3 --; same table, eighth column, line 3 thereof, "67.3" should read -- 76.3 --.

Signed and sealed this 4th day of November 1969.

(SEAL)
Attest:

EDWARD M. FLETCHER, JR.                                  WILLIAM E. SCHUYLER, JR.
Attesting Officer                                              Commissioner of Patents